(12) United States Patent
Aske et al.

(10) Patent No.: US 11,074,490 B2
(45) Date of Patent: Jul. 27, 2021

(54) INTELLIGENT FASTENERS

(71) Applicant: THE BOEING COMPANY, Chicago, IL (US)

(72) Inventors: James A. Aske, Hanahan, SC (US); Jake A. Wilson, Charleston, SC (US); Robert A. Smith, Huntsville, AL (US); Matthew J. Berden, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/662,108

(22) Filed: Oct. 24, 2019

(65) Prior Publication Data

US 2021/0125022 A1 Apr. 29, 2021

(51) Int. Cl.
*G06K 19/077* (2006.01)
*G06F 16/23* (2019.01)
*C09J 163/00* (2006.01)
*H02J 7/34* (2006.01)

(52) U.S. Cl.
CPC ...... *G06K 19/07758* (2013.01); *C09J 163/00* (2013.01); *G06F 16/2379* (2019.01); *G06K 19/07773* (2013.01); *H02J 7/345* (2013.01)

(58) Field of Classification Search
CPC ......... G06K 19/07758; G06K 19/07773; C09J 163/00
USPC ....................................................... 235/492
See application file for complete search history.

(56) References Cited

U.S. PATENT DOCUMENTS

| 6,724,690 | B1* | 4/2004 | Endo | G04B 47/00 368/10 |
| 7,412,898 | B1* | 8/2008 | Smith | G01L 5/24 73/761 |
| 8,521,448 | B1 | 8/2013 | Ung et al. | |
| 8,584,957 | B2* | 11/2013 | Zhu | F16B 31/02 235/492 |
| 2006/0022056 | A1* | 2/2006 | Sakama | G06K 19/07749 235/492 |
| 2007/0103310 | A1* | 5/2007 | Hopman | G06K 19/07758 340/572.8 |
| 2007/0281657 | A1* | 12/2007 | Brommer | H02J 7/0044 455/334 |
| 2008/0122620 | A1* | 5/2008 | Rachwalski | G06K 19/0723 340/572.1 |

(Continued)

FOREIGN PATENT DOCUMENTS

EP 2803871 A1 11/2014

OTHER PUBLICATIONS

European Search Report and Written Opinion for EP Application No. 20199090 dated Mar. 2, 2021.

*Primary Examiner* — Paultep Savusdiphol
(74) *Attorney, Agent, or Firm* — Marshall, Gerstein & Borun LLP

(57) ABSTRACT

A fastener system, which includes a fastener with an RFID tag secured to the fastener, wherein the RFID tag includes an antenna communicatively coupled to an integrated circuit which includes a memory. The fastener system further includes an operating system device, which transmits a command signal containing logistics data to the antenna of the RFID tag wherein the antenna receives the command signal and communicates the command signal containing the logistics data to the integrated circuit.

20 Claims, 8 Drawing Sheets

(56) References Cited

U.S. PATENT DOCUMENTS

| | | | |
|---|---|---|---|
| 2010/0096455 A1* | 4/2010 | Binmore | G06K 7/0008 |
| | | | 235/439 |
| 2011/0266353 A1* | 11/2011 | Binmore | H01Q 1/2208 |
| | | | 235/492 |
| 2012/0298758 A1* | 11/2012 | Vishwanath | A61B 90/98 |
| | | | 235/492 |
| 2013/0186951 A1* | 7/2013 | Zhu | F16B 31/02 |
| | | | 235/375 |
| 2016/0180664 A1* | 6/2016 | Carrender | G06K 19/07758 |
| | | | 340/539.1 |
| 2018/0012047 A1* | 1/2018 | Chu | F16B 31/02 |
| 2019/0244071 A1* | 8/2019 | Grove | G06K 19/07758 |
| 2020/0175348 A1* | 6/2020 | Lai | H01Q 23/00 |

* cited by examiner

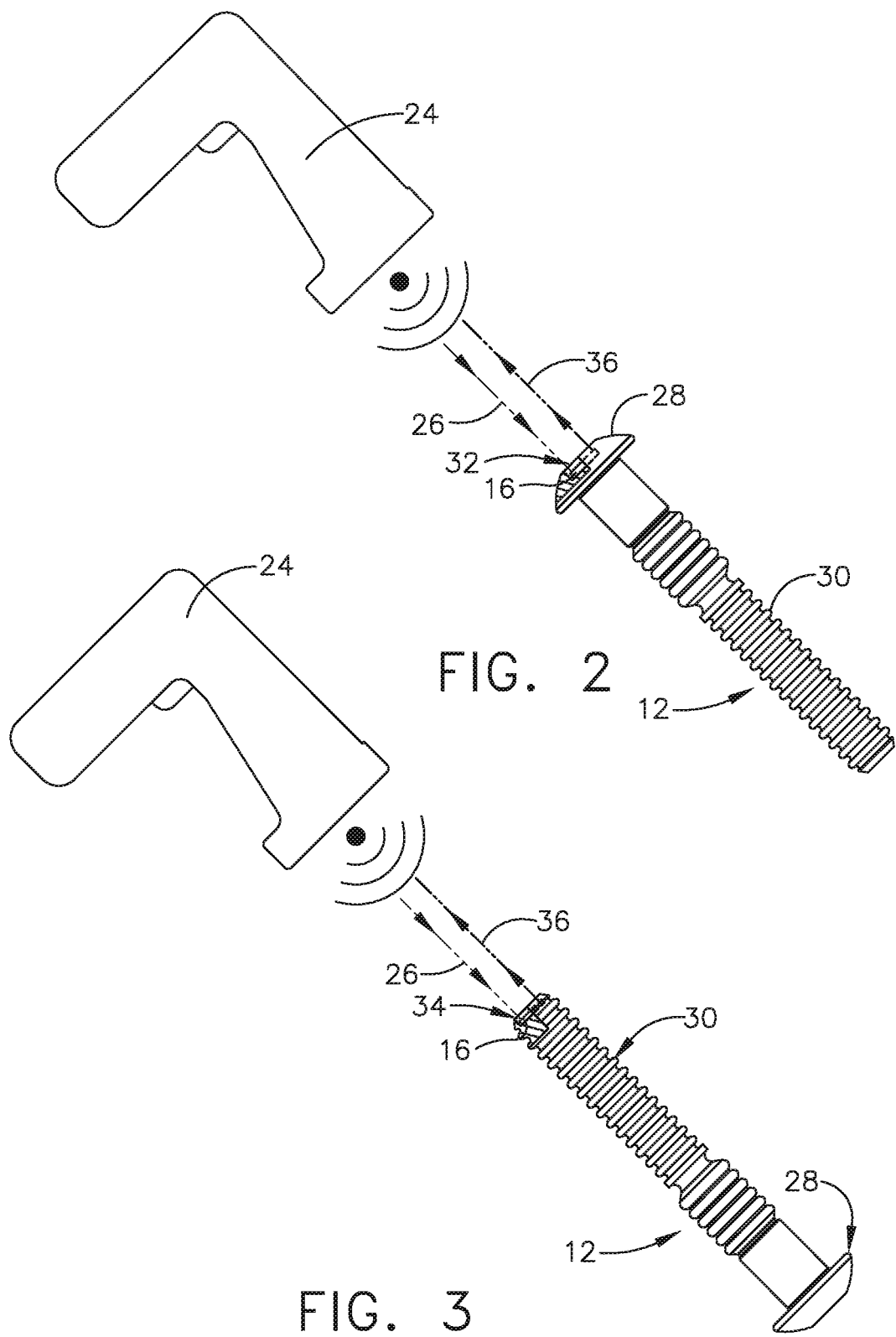

INTELLIGENT FASTENERS

FIELD

This disclosure relates to fasteners and more particularly to fasteners used in fabricating products.

BACKGROUND

In fabricating items, such as for example an aircraft, numerous fasteners are employed for the fabrication. At the time of installation of each fastener, the fabricator desires to collect certain information regarding the fastener and other related installation information for purposes of quality control. In some instances, information like the torque applied to the fastener to install the fastener is obtained through a tool used for installing the fastener. In other situations, an installer may choose to record other quality or logistics data such as recording the time and date of installation, grip length of fastener, type of fastener, identity of installer, location of the fastener on the item being fabricated, engineering number and joint definition location, maintenance manual information with updated revisions, fastener equipment used for installation, work order numbers and information regarding the operation of installing fastener, lot number of fasteners, and any nonconformance data and other quality or logistics data. This quality or logistics data is recorded and kept by the fabricator and is later accessed and supplemented in later maintenance reviews and inspections of the fabricated item such as for example an aircraft. This quality or logistics data can be time consuming to collect, retrieve and supplement.

There is a need for a fabricator to be able to, in a simple, direct and cost effective manner, easily accumulate and access quality or logistics data regarding all fasteners that have been installed in the fabrication of an item, such as an aircraft. The gathering of this information is helpful for the fabricator to have quality control of fabrication of such items as an aircraft including providing an accounting and verification for complete and conforming installation of all fasteners, as well as, utilizing the quality or logistics data for subsequent inspection and maintenance of the aircraft subsequent to fabrication.

Kits have been provided to fabricators, which include fasteners in the kit with each fastener having corresponding logistics data accompanying each fastener. The kit is costly and the accumulation of the logistics data from the kit is cumbersome. Smart fastening systems have been used which include Radio Frequency Identification ("RFID") technology, however, such systems do not include any fastener which receives or transmits data to a fabricator or maintenance service crew.

In one aspect of fabrication of the aircraft, the fabricator needs to verify the installation of all of the fasteners and verify all fastener portions, which were removed from the fastener in the installation process, have not been left inside the aircraft when the fabrication of the aircraft has been completed. The portion of the fastener removed of the fastener needs to be verified that it has been removed from within the aircraft so as not to create foreign object debris ("FOD") in the fabricated aircraft. This operation of verification of removal of fastener portions from the aircraft needs to be done in an efficient cost effective manner.

It is desired by the fabricator to be able to easily retrieve logistics data about each fastener installed in the fabrication of an item, such as an aircraft, so as to have a quality record for each fastener installed in the fabrication process, whether the fastener has been installed manually or by way of automated installation. It is also desired to have this logistics data related to the installed fasteners readily retrieved for maintenance reviews and inspections of the aircraft and also be able to easily alter by way of adding or replacing certain logistics data as needed in the maintenance and inspection reviews of the aircraft.

SUMMARY

An example includes a fastener system, which includes a fastener with an RFID tag secured to the fastener, wherein the RFID tag includes an antenna communicatively coupled to an integrated circuit which includes a memory. The fastener system further includes an operating system device, which transmits a command signal containing logistics data to the antenna of the RFID tag wherein the antenna receives the command signal and communicates the command signal containing the logistics data to the integrated circuit.

An example includes a method for reading data off an installed fastener, which includes transmitting, from an operating system device, a polling signal to a plurality of RFID tags which are secured to fasteners. The method includes receiving, at the operating system device, a polling response signal containing logistics data from one RFID tag of the plurality of RFID tags. Also, the method further includes extracting, by the operating system device, logistics data from the polling response signal.

An example includes a method for verifying fastener installation which includes installing a fastener, which has a RFID tag secured to the fastener, into an item being fabricated and transmitting a command signal to the installed RFID tag from an operating system, wherein the command signal contains logistic data and is stored on the RFID tag and the logistic data is stored in a database. The method further includes separating a portion of the fastener having the RFID tag from a remaining portion of the fastener, which is secured to the item being fabricated and includes reading the logistics data stored on the RFID tag secured to the portion of the fastener. The method further includes comparing the logistics data read to the logistics data stored in the database.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 2 is a schematic perspective view of the fastener system of FIG. 1 without the fastener secured to an aircraft and the RFID tag secured to the fastener associated with a head of the fastener;

FIG. 3 is a schematic perspective view of the fastener system of FIG. 1 without the fastener secured to an aircraft and the RFID tag secured to the fastener associated with a shaft of the fastener;

DESCRIPTION

In the fabrication of items, such as an aircraft, fabricators need to have a simple, direct and cost efficient way to record and retrieve logistics data related to fasteners installed in the item or aircraft so as to maintain quality control records related to the fabrication. In addition, such quality control records are also needed for maintenance and inspection of aircraft at a time subsequent to the fabrication of the aircraft. Quality control records include a wide variety of logistics data with respect to fasteners installed in the aircraft, such as for example, time and date of installation, grip length of fastener, type of fastener, identity of installer, location of the fastener on the item being fabricated, engineering number identification and joint definition location, maintenance manual information with updated revisions, fastener equipment used for installation, work order numbers and information regarding the operation of installing fastener, lot number of fasteners, and any nonconformance data as well as other logistics data desired be kept by the fabricator.

Figure 1:
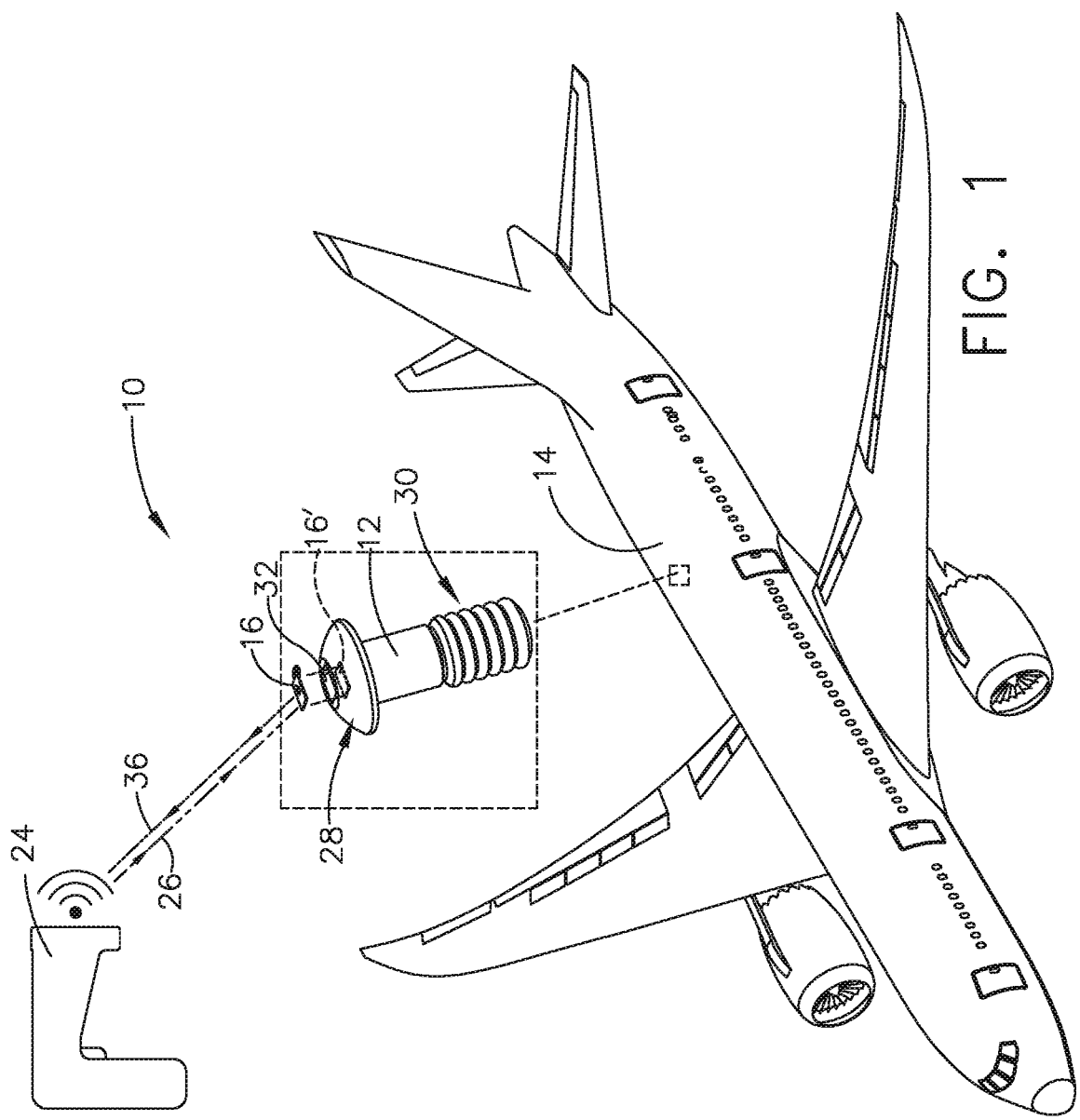
FIG. 1 is a schematic perspective exploded view of a fastener system for an aircraft.
Figure 6:
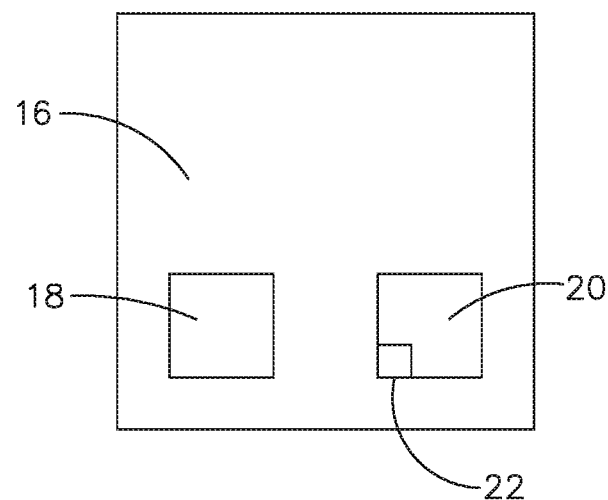
FIG. 6 is a schematic view of a passive RFID tag of FIG. 1.
Figure 7:
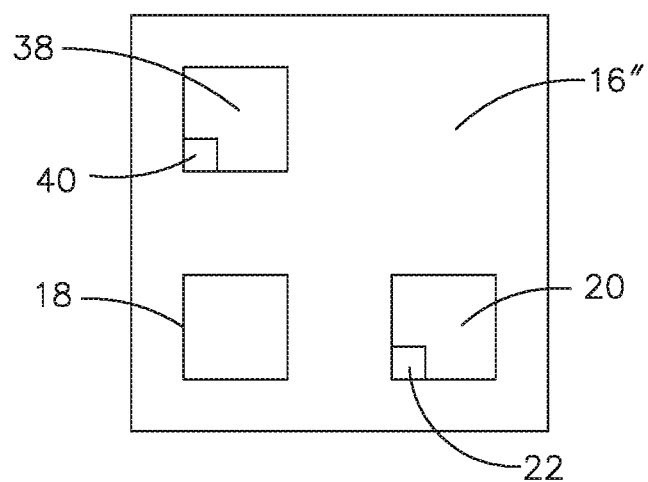
FIG. 7 is a schematic view of an active RFID tag of FIG. 1.

In referring to FIG. 1, fastener system 10, includes fastener 12 installed, in this example, in aircraft 14 with an RFID tag 16 secured to fastener 12, wherein RFID tag 16, is seen in exploded view and as 16' in phantom positioned secured to fastener 12. RFID tag 16, includes, as seen in FIGS. 6 and 7, antenna 18 communicatively coupled to integrated circuit 20, which includes memory 22. Fastener system 10 further includes operating system device 24, which transmits a command signal 26 containing logistics data to antenna 18 of RFID tag 16 wherein antenna 18 receives command signal 26 and communicates command signal 26 containing the logistics data to integrated circuit 20. Operating system device 24 can include any one of a number of devices, such as for example, mobile systems such as a phone, Radio Frequency ("RF") handheld tracking units, ipads and/or RF transceivers on robotic platforms. Operating system device 24, in this example, includes memory for storage and is communicatively connected to another device, as needed, which includes a database so as to store logistics data which the fabricator will have written on and stored on memory 22 of RFID tag 16.

Fastener 12, as seen in FIGS. 1-5A includes head 28 and shaft 30. RFID tag 16 is secured to one of head 28 of fastener 12 or shaft 30 of fastener 12 in this example. Head 28 defines notch 32 and RFID tag 16 is positioned within notch 32 of head 28. Shaft 30 of fastener 12 defines notch 34 and RFID tag 16 is positioned within notch 34 of shaft 30. RFID tag 16 is secured to one of head 28 of fastener 12 or shaft 30 of fastener 12 with an epoxy adhesive (not shown).

In one process of the installation of fasteners 12, fasteners 12 are provided in bulk with RFID tags 16 secured to fasteners 12 without the RFID tags 16 carrying any logistics data. Fastener 12 can be manually installed or by way of automated installation. When fastener 12 is manually installed, logistics data is typically written typically on the RFID tag 16 just prior to or just after the installation of fastener 12. With automated installation the automated installer can similarly write logistics data onto the tag or could do so while fastener 12 is being installed. Fastener 12 with RFID tag 16 can stay with fastener 12 and become part of aircraft 14 or in some instances, where a portion of the fastener 12 is removed in the installation process, the RFID tag 16 is removed with that portion of the fastener 12 from aircraft 14 and is part of a verification process, which will be discussed below, which verifies the portion of the fastener 12 has been removed from, for example, aircraft 14 and has not been left in the aircraft as unwanted FOD.

In fastener system 10, antenna 18, as seen in FIG. 6, receives command signal 26 from operating system device 24, as seen in FIGS. 1-3, wherein command signal 26 also contains power sufficient to operate RFID tag 16 and, in particular, integrated circuit 20. Antenna 18, communicates command signal 26 to integrated circuit 20 such that integrated circuit 20 is powered and the logistics data from command signal 26 is written on and stored in memory 22 of integrated circuit 20.

As seen in FIGS. 2, 3 and 6, RFID tag 16 is what is referred to as a passive RFID tag 16. Command signal 26 is received by antenna 18 and is communicated to integrated circuit 20. Integrated circuit 20 modulates command signal 26 to include response data from integrated circuit 20 of the RFID tag 16 and provides modulated command signal as response signal 36 sent back to operating system 24. Response signal 36, in one example, includes confirmation that command signal 26 has been received by RFID tag 16 and logistics data from command signal 26 has been written on and stored in memory 22 of integrated circuit 20 of the RFID tag 16. In this example, response signal 36 may also include a copy of the logistics data that was received from command signal 26 and written on and stored in memory 22 as part of the confirmation.

As seen in FIGS. 2, 3 and 7, RFID tag 16" alternatively, in this example, includes what is referred to as an active RFID tag 16" which includes power source 38 coupled to antenna 18 and also coupled to integrated circuit 20. In an active RFID tag 16", antenna 18 receives command signal 26, as seen in FIGS. 2 and 3, which includes a command for power source 38 to transmit power to integrated circuit 20 so as to power integrated circuit 20 and the logistics data from command signal 26 is transmitted from antenna 18 to integrated circuit 20 and is written on and stored in memory 22. In this example, antenna 18 could include an antenna array or multiple antennas.

Power source 38 can include one of a variety of different devices such as one of various energy harvesting devices or if space permits a battery source. In this arrangement, energy for operating integrated circuit 20 would not need to be relied upon in coming from a command signal. In the instance of power source 38 being an energy harvesting device, energy can be stored in a capacitor 40 associated with power source 38 for use when a command signal 26 prompts power source 38 to transmit energy from capacitor 40 to integrated circuit 20 for starting integrated circuit 20 and for operating integrated circuit 20. Integrated circuit 20 generates and sends back response signal 36 through antenna 18 to operation system device 24. Response signal will carry, for example, as described above, confirmation that command signal 26 has been received by RFID tag 16" and logistics data from command signal 26 has been written on and stored in memory 22 of integrated circuit 20 of the RFID tag 16". In this example, response signal 36 may also include a copy of the logistics data that was received from command signal 26 and written on and stored in memory 22 as part of the confirmation.

Figure 4:
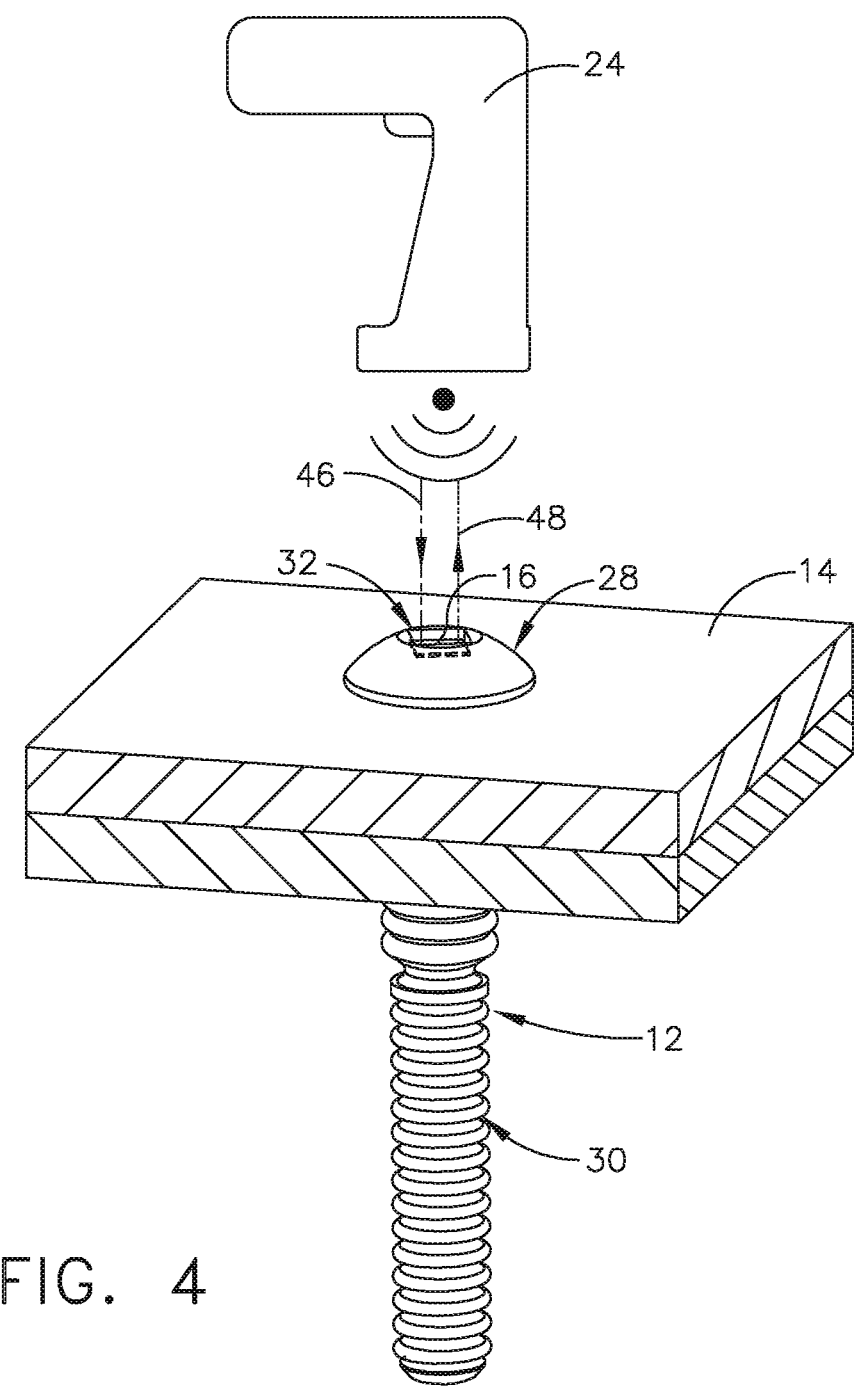
FIG. 4 is a schematic perspective view of the fastener system of FIG. 1 with the fastener secured to the aircraft with the RFID tag secured to a head of the fastener.
Figure 8:
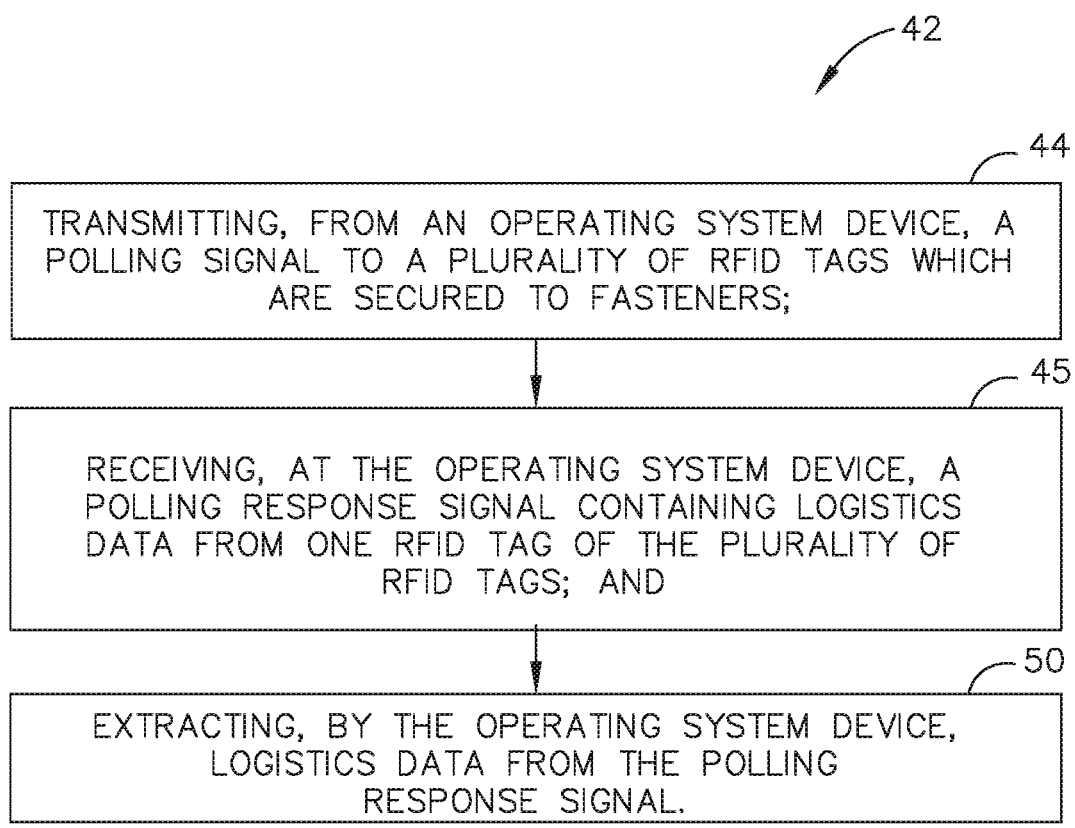
FIG. 8 is a flow chart of a method for reading data off an installed RFID tag which is secured to a fastener.

In referring to FIG. 8, method 42 for reading data off an installed fastener 12 includes transmitting 44, from operating system device 24, a polling signal 46, as seen in FIG. 4, to a plurality of RFID tags 16 (plurality of RFID tags 16 not shown) wherein each fastener 12 includes a tag secured to each fastener 12. Method 42 further includes receiving 45, at operating system device 24, a polling response signal 48 containing logistics data from one RFID tag 16 of the plurality of RFID tags (not shown).

Polling signal 46, with respect to a passive RFID tag 16, as described above, will be received by antenna 18 and power from polling signal 46 will be transmitted to integrated circuit 20 to power integrated circuit 20. Integrated circuit 20 will modulate polling signal 46 and send polling response signal 48 back to operating system 24 through antenna 18. Polling response signal 48 will contain logistics data from memory 22, which is then received by operating system device 24, as seen in FIG. 4.

Polling signal 46, with respect to an active RFID tag 16", as described earlier, will be received by antenna 18, which in turn will cause power source 38 to transmit energy directly to integrated circuit 20 or cause capacitor 40 to transmit energy directly to integrated circuit 20. Antenna 18 will transmit polling signal 46 to integrated circuit 20, which requests integrated circuit 20 to issue polling response signal 48 containing logistics data from memory 22 and transmit the logistics data, in this example, by way of antenna 18 to operating system device 24, as seen in FIG. 4.

Method 42 further includes extracting 50, by the operating system device 24, logistics data from response signal 48 received by operating system device 24. Extracting 50 logistics data from polling response signal 48 can, in this example, be accomplished by way of a processor within operating system device 24. Prior to transmitting polling signal 46, operating system device 24, either with the same or a different operating system device 24, will have, as described earlier above, transmitted a command signal 26, as seen in FIGS. 2 and 3, which will have caused integrated circuit 20 to have logistics data written on and stored in memory 22 of RFID tag 16 or RFID tag 16" and had logistics data also stored in a database (not shown), in this example, a database is included in a separate device than that of operating system device 24 with which operating system device 24 is communicatively connected.

Method 42 further includes comparing, by one or more processors (not shown) within or communicatively connected to operating system device 24, logistics data extracted from polling response signal 48 to logistics data which was written on and stored in memory 22 of RFID tag 16, 16" and stored in the database (not shown). Method 42 further includes identifying, by the one or more processors (not shown), an RFID tag for maintenance based on the extracted logistics data from polling response signal 48. For example, polling response signal 48 content, such as logistics data in this example, when compared with logistics data from the database (not shown) may indicate logistics data from the polling response signal 48 is absent or incomplete, which would indicate there may be current damage to RFID tag 16, 16" and may further indicate further inspection and possible maintenance be administered to RFID tag 16, 16" and possibly to fastener 12 as well.

At times when the fabricator and/or maintenance crews may be in need to update or otherwise alter logistics data in memory 22, method 42 includes sending, from a second operating system device 24, which could the same or a different operating system device 24 used in sending command signal 26 and receiving response signal 36. Command signal 26, as described earlier, can be used to transmit from operating system device 24 and be received by RFID tag 16, 16" so as to cause RFID tag 16, 16". Command signal 26 can contain instructions to write new logistics data on and RFID tag 16, 16". In this example, integrated circuit 20 writes new logistics data on and stores in memory 22. New logistics data can include a wide variety of information such as mentioned earlier and can include identification of an inspection as well as other pertinent information needed for purposes of quality record keeping with respect to, for example, aircraft 14.

Figure 5A:
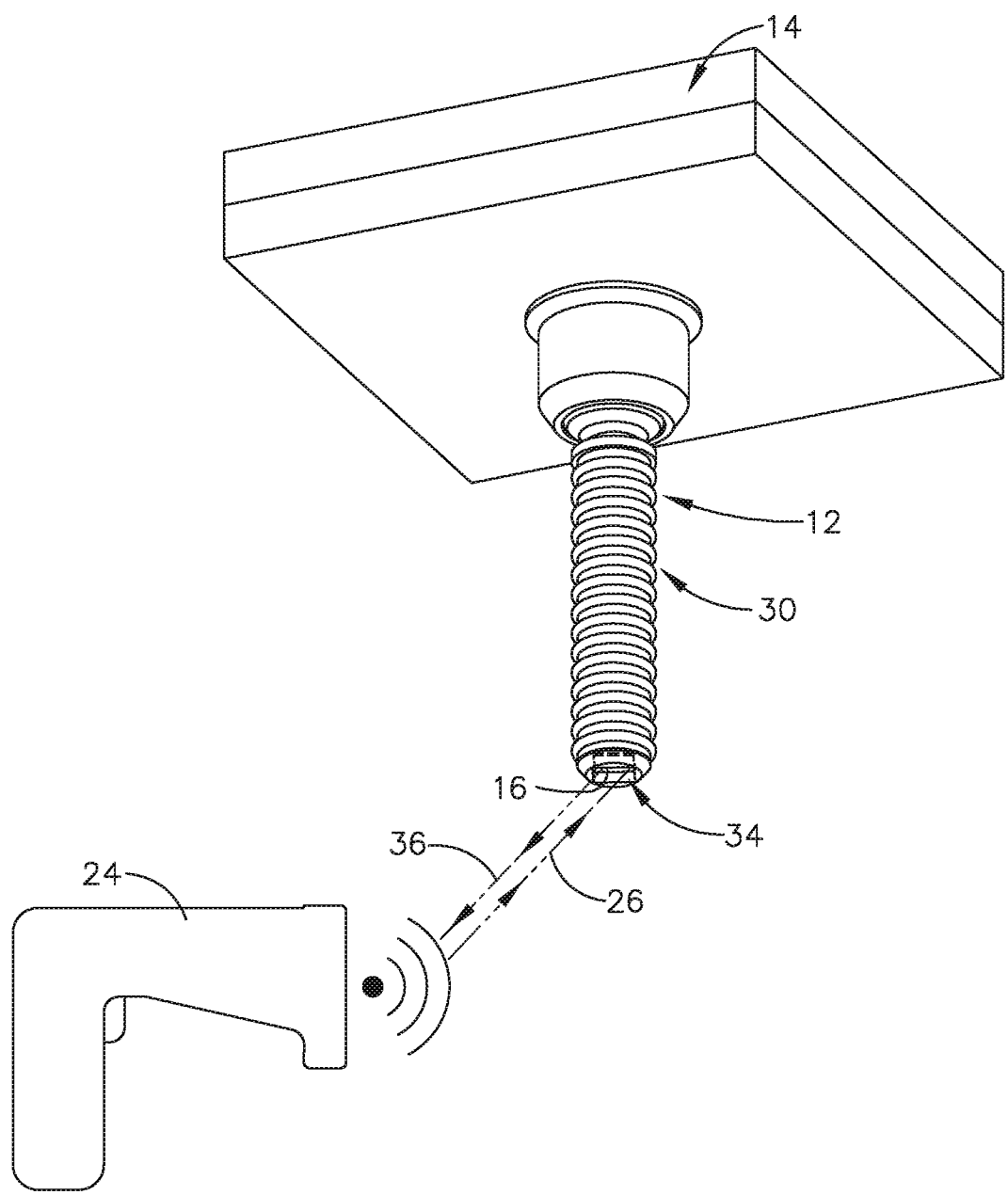
FIG. 5A is a schematic perspective view of the fastener system of FIG. 1 with the fastener secured to the aircraft and with the RFID tag secured to a shaft of the fastener.
Figure 5B:
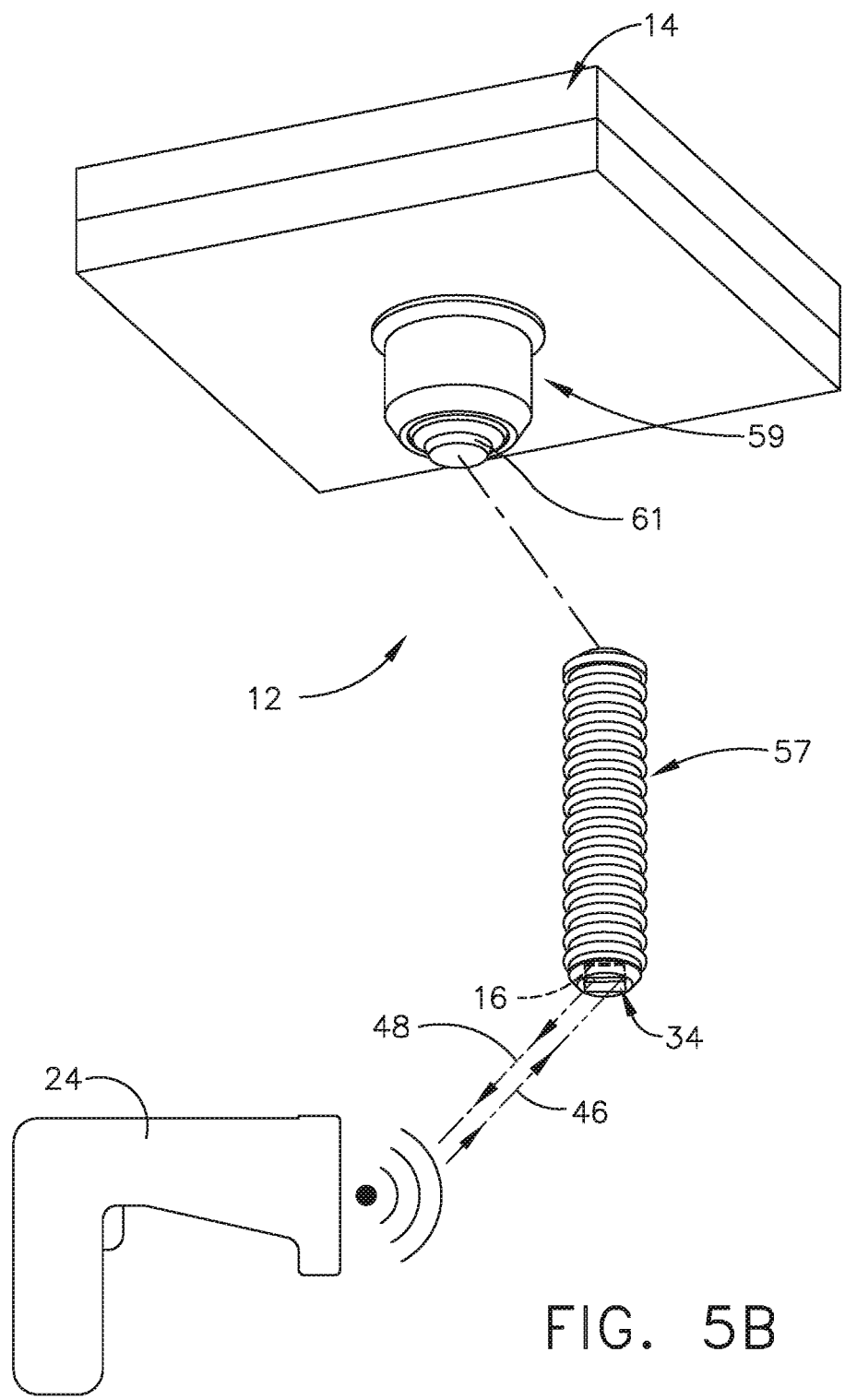
FIG. 5B is a schematic perspective view of the fastener system of FIG. 5A with removal of a portion of the shaft of the fastener which has the RFID tag secured to the portion and with a remaining portion of the fastener secured to a shaft of the fastener.
Figure 9:
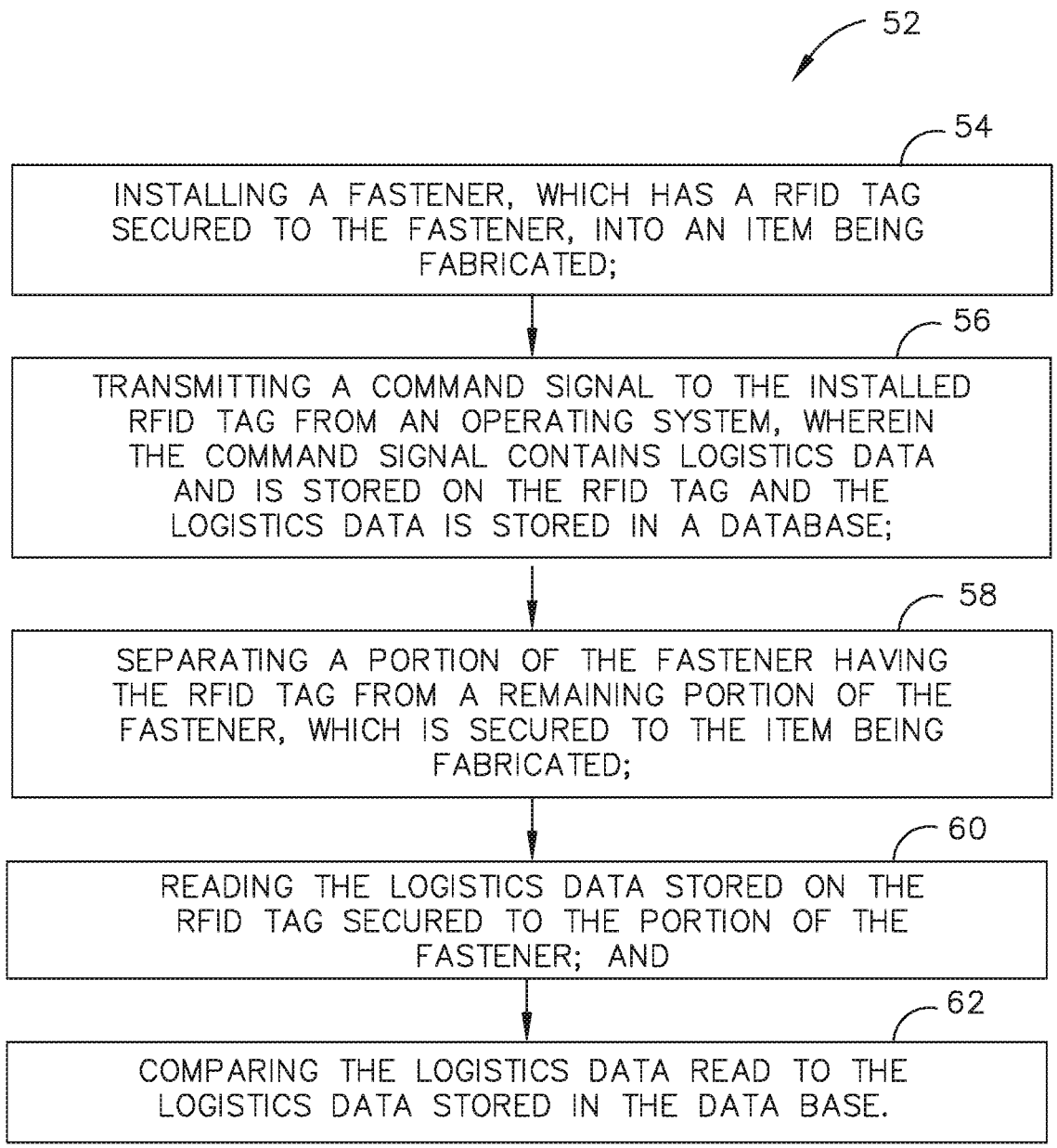
FIG. 9 is a method for verifying fastener installation.

In referring to FIGS. 5A, 5B and 9, method 52 for verifying fastener 12 installation includes installing 54 fastener 12, which has a RFID tag 16 secured to fastener 12 into an item being fabricated such as aircraft 14. In this example, a large number of fasteners 12 with RFID tags 16 secured to RFID tags 16 are utilized in manual or automated installation of fasteners 12 when fabricating an item such as aircraft 14. As mentioned earlier, in some processes of installation fasteners 12 are loaded into hoppers with no logistics data stored in RFID tags 16. Such RFID tags 16 can include one of a wide variety of tags including a passive or active tag.

Method 52 includes transmitting 56 a command signal 26, as seen in FIG. 5A, from operating system device 24, which may include for example a wide variety of devices as mentioned earlier which can include a handheld device or be done by way of an automated installation device. Transmitting 56 of command signal 26, as seen in FIG. 5A, is installed in RFID tag 16 from an operating system device 24, wherein command signal 26 contains logistics data and is stored on the RFID tag 16 as described above wherein the logistics data is written on and stored in memory 22 of integrated circuit 20 and the logistic data is stored in a database as earlier mentioned. Method 52 further includes separating portion 57 of fastener 12 having RFID tag 16, as seen in FIG. 5B, from remaining portion 59 of fastener 12, which is secured to the item or in this example aircraft 14 being fabricated. In this example, method 52 further includes reading 60, the logistics data stored on RFID tag 16 secured to portion 57 of fastener 12. In this example, portions 57 are collected from aircraft 14 and a polling signal 46, such as seen in FIG. 5B, is transmitted, and RFID tag 16 secured to portion 57, if present and intact with portion 57, resends response polling signal 48 to operating system device 24. Method 52 includes comparing 62, the logistics data read by a processor (not shown) of operating system device 24, which has received polling response signal 48 and extracted the logistics data from polling response signal 48, to the logistics data in the database (not shown) as mentioned earlier, which stores the logistics data of each RFID tag 16 that was written on and stored in memory 20 of each RFID tag 16.

Method 52 further includes verifying portion 57 of fastener 12 which has been separated from remaining portion 59 of fastener, as seen in FIG. 5B, is not located within the item or aircraft 14 being fabricated. With comparing 62, logistics data from portions 57 of fastener 12 to data logistics in the database, not making a match between the logistics data of the RFID tags 16 of portions 57 to the logistics data in the database such will identify specific portions 57 which could still be present within aircraft 14 as FOD and will need to be extracted from aircraft 14. If a match is attained, a confirmation is made that all portions 57 have been removed from within aircraft 14. In this example, remaining portion 59 of fastener 12 includes head 28, as seen for example in FIG. 2, of fastener 12 and remaining portion 61 of shaft 30 of fastener 12.

While various embodiments have been described above, this disclosure is not intended to be limited thereto. Variations can be made to the disclosed embodiments that are still within the scope of the appended claims.

What is claimed:

1. A fastener system, comprising:
a fastener including a head and a shaft, the shaft having a separating portion capable of being separated from a remaining portion of the shaft, the separating portion having an RFID tag secured thereto, wherein the RFID tag includes an antenna communicatively coupled to an integrated circuit which includes a memory; and
an operating system device, which transmits a command signal containing logistics data to the antenna of the RFID tag wherein the antenna receives the command signal and communicates the command signal containing the logistics data to the integrated circuit.

2. The fastener system of claim 1, wherein the shaft defines a notch and the RFID tag is positioned within the notch of the shaft.

3. The fastener system of claim 1, wherein the RFID tag is secured to the separating portion of the shaft of the fastener with an epoxy adhesive.

4. The fastener system of claim 1, wherein:
the antenna receives the command signal from the operating system device, wherein the command signal also contains power sufficient to operate the RFID tag; and
the antenna communicates the command signal to the integrated circuit such that the integrated circuit is powered and the logistics data is written on and stored in the memory of the integrated circuit.

5. The fastener system of claim 4, wherein the integrated circuit modulates the command signal to include response data from the RFID tag and sends a response signal back to the operating system.

6. The fastener system of claim 1, wherein:
the RFID tag further includes a power source coupled to the antenna and to the integrated circuit; and
the antenna receives the command signal which includes a command for the power source to transmit power to the integrated circuit so as to power the integrated circuit and the logistics data from the command signal is transmitted from the antenna to the integrated circuit and is written on and stored in the memory.

7. The fastener system of claim 6, wherein the power source includes an energy harvesting device.

8. The fastener system of claim 7, wherein the energy harvesting device includes a capacitor for storing energy generated by the energy harvesting device.

9. A method for reading data off an installed fastener, comprising:
transmitting, from an operating system device, a polling signal to a plurality of RFID tags, wherein each of the plurality of RFID tags is secured to a separating portion of a shaft of the installed fastener;
receiving, at the operating system device, a polling response signal containing logistics data from one RFID tag of the plurality of RFID tags; and
extracting, by the operating system device, logistics data from the polling response signal.

10. The method of claim 9, further including writing, by the operating system device, logistics data onto the RFID tag prior to transmitting polling signal and storing the logistics data in a database.

11. The method of claim 10, including comparing, by one or more processors within or communicatively connected to the operating system device, logistics data extracted from the polling response signal to the logistics data which was written onto the RFID tag and stored in the database.

12. A method for verifying fastener installation, comprising:
installing a fastener, which has a head connected to a shaft in which a RFID tag is secured to a separating portion of the shaft of the fastener separable from a remaining portion of the shaft, into an item being fabricated;
transmitting a command signal to the RFID tag from an operating system, wherein the command signal contains logistic data and is stored on the RFID tag and the logistic data is stored in a database;
separating the separating portion of the fastener, having the RFID tag, from the remaining portion of the fastener, which is secured to the item being fabricated;
reading the logistics data stored on the RFID tag secured to the separating portion of the fastener; and
comparing the logistics data read from the RFID tag to the logistics data stored in the database.

13. The method of claim 12, including verifying the separating portion of the fastener, which has been separated from a remaining portion of the fastener, is not located within the item being fabricated.

14. The method of claim 13, wherein the remaining portion of the fastener includes the head of the fastener.

15. The method of claim 14 wherein, the remaining portion of the fastener includes a remaining portion of the shaft connected to the head of the fastener.

16. The method of claim 12 wherein, the logistic data stored on the RFID tag includes data which identifies the fastener secured to the item being fabricated.

17. The method of claim 16 wherein, the logistic data in the RFID tag includes time and date of installation of the fastener, type of fastener, and engineering number and joint definition location.

18. The method of claim 12 wherein, separating the separating portion of the fastener, having the RFID tag secured to the separating portion, includes extracting the separating portion from the item being fabricated.

19. The method of claim 18 wherein, reading includes reading the logistics data on the RFID tag secured to the separating portion, which includes identification data for the separating portion.

20. The method of claim 19 wherein, comparing identification data of the separating portion with identification data from the database includes confirming whether a match in the identification data of the separating portion compared to the identification data from the database has been attained.

* * * * *